US008883917B1

(12) United States Patent
Davies et al.

(10) Patent No.: US 8,883,917 B1
(45) Date of Patent: Nov. 11, 2014

(54) NYLON POLYMERS HAVING A LOW COEFFICIENT OF FRICTION AND METHOD FOR THE MANUFACTURE THEREOF

(75) Inventors: Jack D. Davies, Houma, LA (US); Gregory J. Biederman, Manchester, NH (US); Christopher A. Coco, Salem, NH (US)

(73) Assignee: Nylon Corporation of America, Inc., Manchester, NH (US)

( * ) Notice: Subject to any disclaimer, the term of this patent is extended or adjusted under 35 U.S.C. 154(b) by 219 days.

(21) Appl. No.: 13/608,168

(22) Filed: Sep. 10, 2012

(51) Int. Cl.
*C08L 77/00* (2006.01)

(52) U.S. Cl.
USPC .......................................... 524/845; 524/492

(58) Field of Classification Search
CPC .......... C08L 77/00; C08L 77/02; C08L 77/06
USPC ................................................ 524/845, 492
See application file for complete search history.

(56) References Cited

U.S. PATENT DOCUMENTS

| | | | |
|---|---|---|---|
| 7,488,533 B2 | 2/2009 | Nishi et al. | |
| 7,749,024 B2 | 7/2010 | Chambers et al. | |
| 8,043,119 B2 | 10/2011 | Kummer et al. | |
| 2012/0234206 A1* | 9/2012 | Greenwood et al. | 106/287.26 |

FOREIGN PATENT DOCUMENTS

| | | |
|---|---|---|
| EP | 1 651 566 B1 | 12/2011 |
| WO | WO/97/38043 A1 | 10/1997 |

OTHER PUBLICATIONS

Technical Data for "Sylysia FCP", Fuji Silysia Chemical Ltd., undated, available on internet at: http://www.tcrindustries.com/Principals/BROCHURES/fujibrochures/FCP%20Brochure.pdf.

Yang et al., "Preparation of polyamide 6/silica nanocomposites from silica surface intitiated ring-opening anionic polymerization", eXPRESS Polymer Letters vol. 1, No. 7 (2007) 433-442.

Janicek, "Polymer/Silica Nanocomposite System", Bachelor Thesis, 2007, Tomas Bata University including technical information in Appedix 3 regarding Aerosil 200, R 972, and R 9200 (Degussa), data from Sigma-Aldrich regarding Aerosil and Cab-O-Sil, Cab-O-Sil LM-150, M-5, EH-5, TS-610, TS-530 (Cabot), and HDK—Pyrogenic Silica (Wacker Silicones); total 108 pages.

Khan et al., "Rheology of Fumed Silica Dispersion for Fiber-Optic Cables", Polymer Engineering and Science, Dec. 1991, vol. 31, No. 24; pp. 1701-1707.

* cited by examiner

*Primary Examiner* — Edward Cain
(74) *Attorney, Agent, or Firm* — Renner Kenner Greive Bobak Taylor & Weber

(57) ABSTRACT

A method for the preparation of a polyamide-based composition provides for the substantially uniform dispersion of particulate silica and, optionally, mineral oil and any other lubricant additive, within a polyamide matrix. The method includes mixing particulate silica, and optionally, mineral oil and other lubricant additives, to one or more polyamide-producing monomers, and water, to form an emulsion or suspension wherein the particulate silica (and mineral oil and other lubricant additives, when added) are substantially uniformly dispersed therein, and then in situ polymerizing the monomer(s) to provide a polyamide matrix wherein the particulate silica, and optional mineral oil and other optional lubricant additives, remain substantially uniformly dispersed in the resulting polyamide matrix to form the polyamide-based composition. A polyamide-based composition comprising a polyamide matrix having silica and optionally, mineral oil and other lubricant additives, substantially uniformly dispersed within the polyamide matrix is also provided.

54 Claims, 3 Drawing Sheets

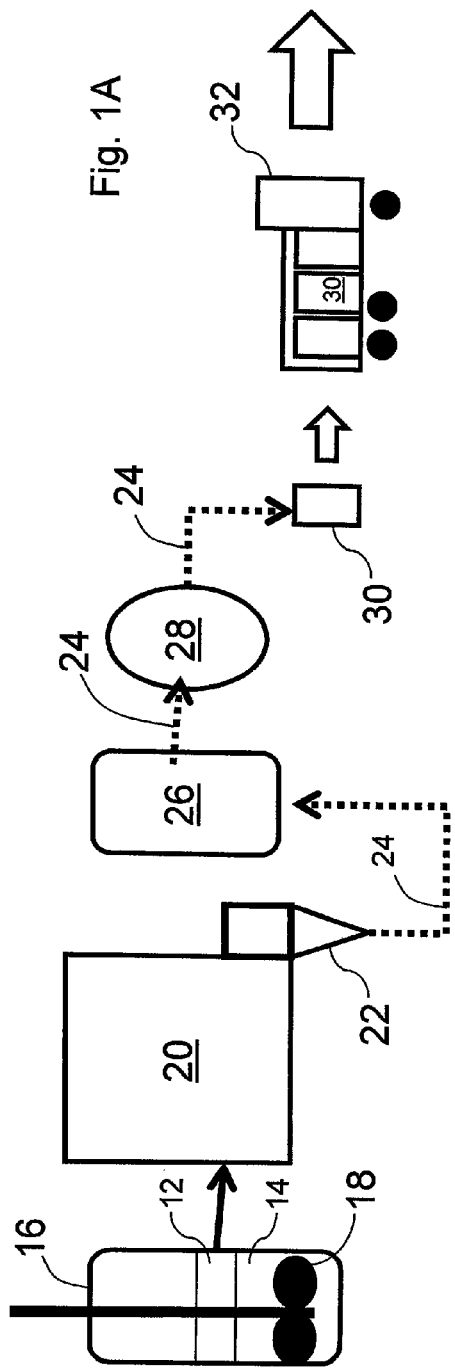
Fig. 1A
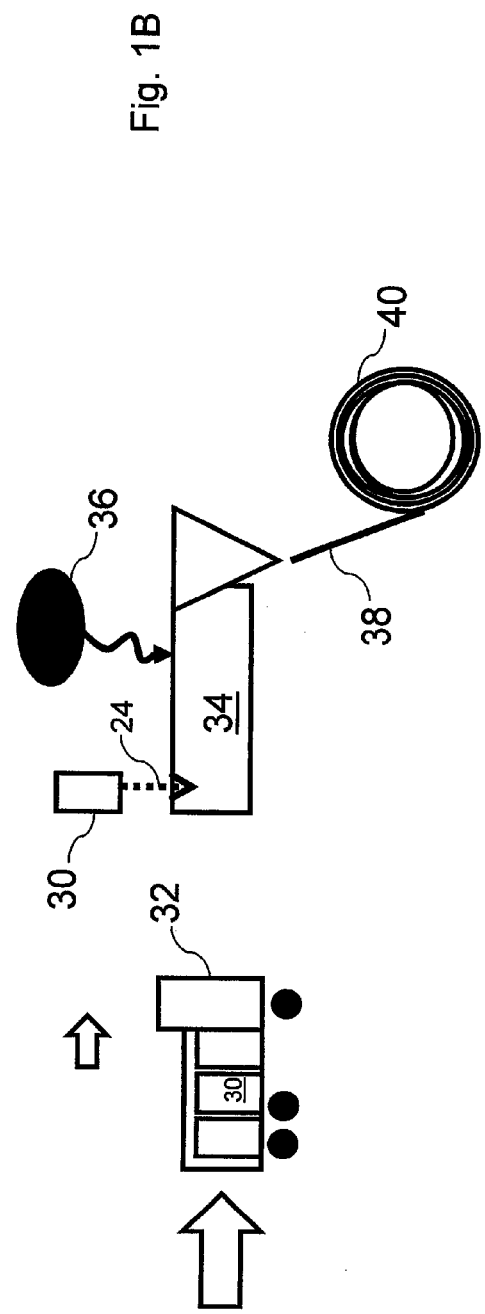
Fig. 1B
Fig. 1 (Prior Art)

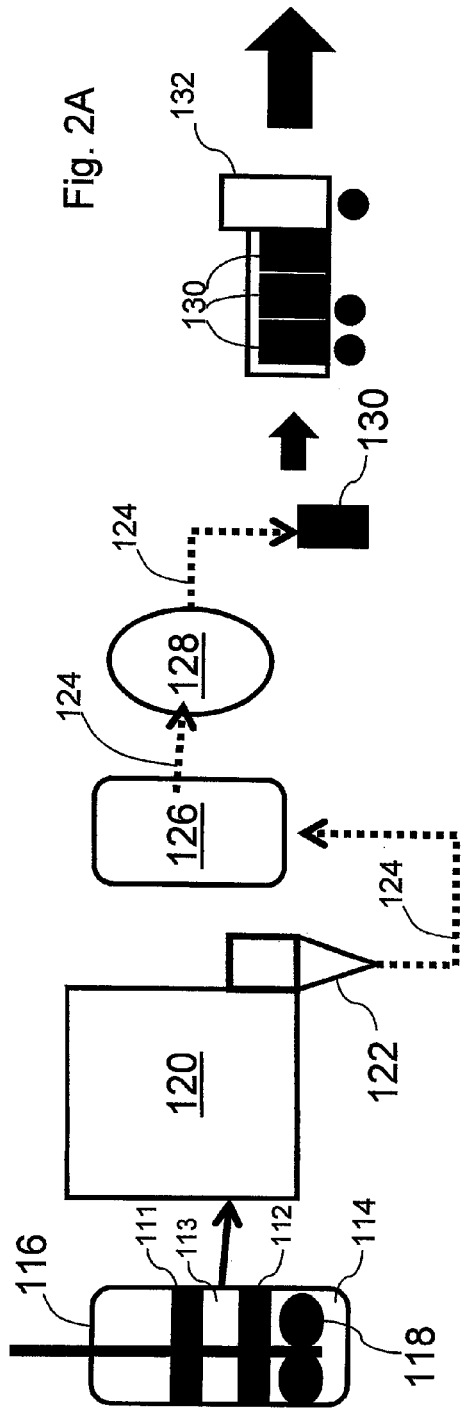
Fig. 2A
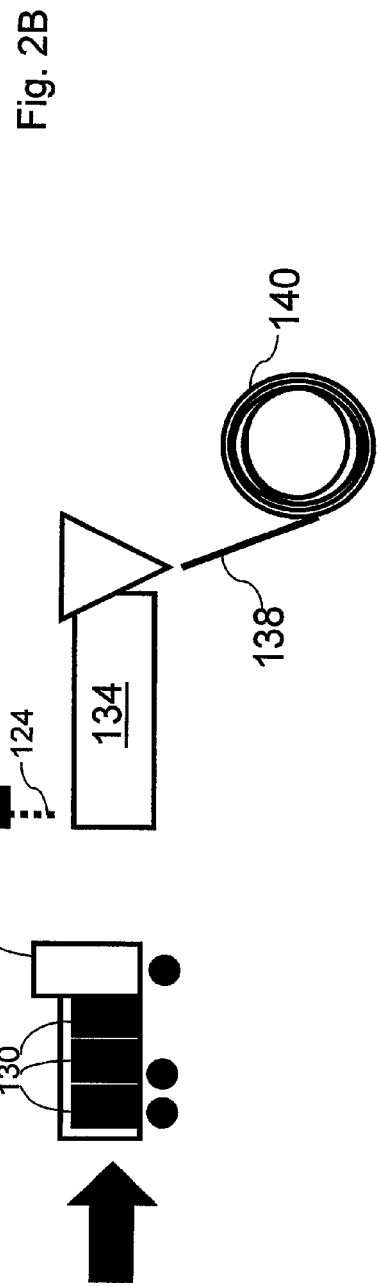
Fig. 2B
Fig. 2

NYLON POLYMERS HAVING A LOW COEFFICIENT OF FRICTION AND METHOD FOR THE MANUFACTURE THEREOF

TECHNICAL FIELD

The present invention relates to a nylon polymer having a low coefficient of friction. More particularly, the present invention relates to a method of preparing a polyamide-based composition (e.g., a nylon polymer) having silica and, optionally, mineral oil and other lubricant additives, substantially uniformly dispersed into a polyamide matrix so as to provide a polyamide-based composition that, when extruded, compounded, casted, molded, or otherwise formed into a product, provides the surface of that product with a low coefficient of friction. The invention is particularly suitable for use in products where low surface coefficient of frictions are desired, such as low friction cables or "slick" sheaths for THHN cables commonly used in building wire.

BACKGROUND

Building wire is widely used to carry electrical current to all external uses of power in industrial, residential and commercial buildings. THHN (Thermoplastic High Heat-resistant Nylon coated) building wire is one type of wire or cable commonly used for this purpose. Typically, THHN building wire comes in stranded or solid conductors depending on the size. For example, solid conductors may include copper or aluminum, which are then covered in PVC (polyvinyl chloride) insulation with a nylon jacket or sheath. THHN building wire may also be used for wiring of machine tools, control circuits or on certain appliances. Commonly known cables used in building wire include, but not limited to Types THHN, THWN, THWN-2 type wires, 14-4/0 AWG, and 250-2000 kcmil sizes.

The prior art discloses that electrical cables such as THHN building wire generally include a conductor core and also an outer jacket or sheath. The term "sheath" is defined to mean the outermost protective jacket or covering surrounding a conductor core, whether of a single type material or multiple layers of the same or different material. The conductor core may typically be, for example, a single metal wire, multiple small wires twisted together to make a "stranded" cable, or multiple insulated wires or other type electrical conductors acting together to serve a particular function (e.g., three-phase connection). The sheath may comprise one or more layers of polymeric or other material to provide physical, mechanical, electrical insulating and/or chemical protection for the underlying cable components. The exterior portion of the sheath may be made of a polyamide composition, also often referred to as nylon. For example, a THHN building wire may comprise a conductor core of a single solid or stranded conductor, surrounded by a layer of polyvinyl chloride (PVC) electrical insulation, covered by an outer layer of nylon.

Installation of electrical cable often requires that it be pulled through tight spaces or small openings in, and in engagement with, narrow conduits, raceways, cabletrays, or passageways in rafters or joists. This becomes problematic since the exterior surface of the cable sheath normally has a high coefficient of friction, therefore requiring a large pulling force. Moreover, installation parameters include maximum allowable cable pulling tension and/or sidewall pressure limits. Exceeding these limits can result in degradation of the cable, physical damage and inferior installation. Thus, the need exists for a cable or wire that has a relatively low surface coefficient of friction so as to allow the installer to more easily pull the wire through the spaces and openings without too large of a pulling force that would cause degradation or damage to the wire or cable.

To overcome this problem, the general industry practice has been to coat the exterior surface of the cable sheath or jacket with a pulling lubricant at the job site in order to reduce the coefficient of friction between this surface and the conduit walls or like surfaces, typically using vaselines or lubricants produced specifically, and well known in the industry, for such purpose, such as Yellow 77®. As used herein, the term "pulling lubricant" is defined to mean a lubricating material added after polymerization of the nylon polymer, and typically during extrusion or formation of the product, or coated onto the finished product, which reduces the coefficient of friction of the exterior surface of the sheath or jacket of the cable to facilitate the pulling of the cable.

The aforementioned industry practice of applying a pulling lubricant to the finished cable at the work site poses problems, principally due to the additional time, expense and manpower required to lubricate the finished cable surface at the job site as well as to clean up after the lubricating process is completed. Thus, the need exists to provide a cable or wire, or at least an exterior sheath or jacket for a cable or wire that does not require the application of pulling lubricants at the work site.

Alternative solutions have been tried but have been generally unsuccessful, including the extrusion of a lubricant layer over the extruded polymeric sheath during the manufacturing of the cable, or the application of granules of material to the still-hot sheath during the extrusion process, which granules are designed to become detached when the cable is pulled through the duct. These solutions not only require major alterations of the manufacturing line, but also result in a loss in manufacturing time, increased economic costs, and undesirable fluctuations in the geometrical dimensions of the cable sheaths or jackets.

At least one patent in the prior art has distinguished between what are referred to as "pulling lubricants" and what are "processing lubricants." A pulling lubricant is a lubricant that is applied to the nylon polymer product and appears at the outside surface of the sheath or jacket of the cable and is effective in lowering the surface coefficient of friction so as to reduce the force necessary to pull the cable along or through building surfaces or enclosures. A processing lubricant is lubricating material is a lubricant that is applied to the nylon polymer composition to facilitate the cable or wire manufacturing process, such as the flow of polymer chains during any polymer compounding as well as during the extrusion processes while the polymer is in its molten or melt phase. Cable manufacturers have long used processing lubricants, such as stearic acid or ethylene bis-stearamide wax, as a minor component of the polymeric compound from which the cable sheath or jacket is formed. Because a processing lubricant is normally not effective except when the polymer is in this melt phase, the effect of a processing lubricant is essentially non-existent in the final hardened polymer sheath of the cable. Under current technology, even where there may be an excessive amount of the processing lubricant, a separate pulling lubricant would still be required to sufficiently reduce the cable sheath's or jacket's exterior surface coefficient of friction in order to minimize the pulling force necessary to install the cable. In both definitions, however, the lubricants are added to already polymerized nylon polymer compositions either during a post-polymerization compounding process, during production of the cables or wires, or after.

In light of the need for better lubricity of the cable or wire, attempts have been made to provide building wire cables, and particularly the nylon cable outer sheaths and jackets used in building wire, with more slickness, i.e., a lower coefficient of friction, such that less externally applied pulling lubricants are required in order to minimize the pulling force necessary to install the building wire. In fact, it would be highly desirable if no externally applied pulling lubricants were necessary to pull the building wire, thereby saving costs, the mess created by using externally applied pulling lubricants, and operator strength for pulling the cable or wire.

Accordingly, attempts have been made to produce a cable or building wire with a sheath or jacket made of nylon material into which a lubricating agent, such as a silicone oil-based or an erucamide-based lubricant, is introduced. By doing so, the lubricity of the polymerized nylon cable, or stated another way, the coefficient of friction of the nylon cable or wire is lowered. That is, the lower the coefficient of friction, the more lubricity and more slickness is provided to the cable or wire. As used herein, a "lubricating agent" is a lubricant that is added to a nylon polymer composition after polymerization of the polyamide-producing monomers into nylon or other polyamides, whether added before, during or after the formation of product. Thus, by this definition, both pulling lubricants and processing lubricants, as well as any other lubricants that are added to the nylon polymer composition in any post-polymerization process, are considered lubricating agents.

One well known method for adding lubricating agents, e.g., silicone oil-based lubricants or erucamide-based lubricants, to the nylon material is accomplished by compounding the lubricant with remelted nylon polymer pellets in a post-polymerization extrusion process. Cables having outer sheaths or jackets produced via this process have been found to have a reduced surface coefficient of friction sufficient to lower the required installation pulling force of the cable, such that the need for externally applied pulling lubricants can be greatly reduced or even eliminated. Unfortunately, it has been found that, in order to be effective in lowering the coefficient of friction and to sufficiently increase the slickness of the cable (and more particularly, its sheaths) via this method, high loadings of at least 9% by weight of lubricating agents are required. While improving surface lubricity, such higher loadings of lubricating agents can compromise cable processing efficiency, can reduce protective sheath mechanical properties and can reduce flame retardancy, all of which compromise the desired characteristics of the cable sheath.

Thus, the need exists for improved nylon compositions having a low surface coefficient of friction, and particularly, compositions having a polyamide matrix suitable for use in building wire as slick cables or cable sheaths that do not require high levels of lubricating agents to be added during any post-polymerization process. Heretofore, no one has successfully produced a nylon polymer composition that has achieved this need for the slick cable and building wire industry.

Silicon dioxide, commonly known as silica, is an inorganic material derived from quartz and other rock like minerals. In one instance, namely, in the production of bi-axial oriented polyamide film compositions for the film packaging industry, it has been found that the intimate dispersion of very low amounts (i.e., 2.0 wt. % or less) of silica having a particular particle diameter (of 0.5 to 5 μm) during the preparation of a polyamide film can provide a nylon polymer composition having excellent slipperiness. For film producers, the advantage of polymer film containing particulate silica is to avoid film blocking, where adjacent (on top of each other) layers often stick to each other. Having a nylon composition with increased slipperiness helps to avoid this problem.

However, the use of greater amounts of silica or larger particle sizes of silica was found to be problematic in that the greater amounts of silica or larger particles was shown to create aggregation (i.e., agglomeration of particles) and migration of the particles to the surface of the films. This was noted to cause film breakage during processing and film aesthetic defects, inasmuch as the films were required to be clear, but aggregation and migration of silica is well known to cause clarity issues in films. Further, it was found that larger particles of silica and/or high loadings of silica have a tendency to clog filters during processing, to increase the likelihood of caking during processing, and to provide overall bad workability for the nylon polymer composition, thus making the addition of silica not attractive for other commercial purposes. Thus, only very small amounts and very small particles of silica were shown to be suitable for use in the limited field of bi-axial oriented polyamide film.

Nevertheless, if a nylon polymer composition could be made with particulate silica having much larger particle sizes (significantly larger than those used in the nylon compositions for anti-blocking films), or alternatively, in sufficient loadings (significantly higher than those used in nylon compositions for anti-blocking films) added in before the polymerization process to provide inherent lubricity to the nylon polymer composition itself, such nylon polymer compositions would be highly desirable in any of a number of industries, including the slick cable and building wire industry. If the surface coefficient of friction of the nylon polymer composition after polymerization was lowered sufficiently enough, no additional lubricating agents would be needed, and even reducing the amount of lubricating agents needed would be beneficial to many industries.

Such desirable nylon polymer compositions could use silica or other lubricant additives to obtain lubricity and not require lubricating agents, such as silicone oil, in them. As the terms are used herein, there is a distinction to be made between "lubricating agents" and "lubricant additives." As used herein and as defined above, lubricating agents include both pulling lubricants and processing lubricants, as well as any other lubricants that are added to the nylon polymer composition whether added before or after the formation of the product, but after the polymerization process for producing the nylon polymer compositions have occurred. In contrast, lubricant additives are defined as lubricants that are specifically mixed with at least one polymer-producing monomer and water prior to polymerization, such that the resultant polymer, here, polyamide (nylon) polymer, contains the lubricant additive in situ, within the nylon polymer composition upon polymerization. Such polymers are made preferably with particulate silica well-dispersed (i.e., homogeneous) within the polymer backbone. Such polymers provide the advantage of being suitable for the production and manufacture of slick cables or cable sheaths or jackets for building wire. The silica may be either chemically or mechanically bound within the polyamide matrix.

In addition to the incorporation of silica, it is believed that the incorporation of lubricant additives such as mineral oil would also be desirable. However, heretofore, the introduction, let alone the substantially uniform dispersion, of lubricant additives into a polyamide matrix prior to polymerization has never been successful due to the "oil like" nature of the lubricant additives. Introduction of lubricating agents in a subsequent, post-polymerization extrusion/compounding process has been well documented, but high levels of lubricating agents are required due to the lubrication method and the lack of synergy achieved between the lubricating agents and the polyamide matrix. Moreover, the introduction of silica in the post-polymerization process does not create sufficient synergy or lower the surface coefficient of friction sufficiently enough to allow even a significant reduction in the amounts of the lubricating agents used.

Thus, the need continues to exist for a process by which a lubricant additive, such as mineral oil, can be added to a nylon polymer composition. Such a process will necessarily need to be able to substantially uniformly disperse the lubricant additive, as well as any other component, e.g., silica, throughout the polymer matrix in order to achieve the desired surface lubricity necessary for satisfactory use as the sheath or jacket of a wire or cable. Such a process would satisfy a long felt need for cost effective manufacturing of polyamides suitable, for example, in the forming of slick cables and other applications. However, currently, the best alternative is to add high loadings of lubricating agents during the production of the cable or wire sheaths or jackets, a well known post-polymerization process.

SUMMARY OF THE INVENTION

One aspect of the present invention may be achieved by a method for the preparation of a polyamide-based composition, wherein particulate silica is substantially uniformly dispersed within a polyamide matrix that forms the polyamide-based composition. By the term "substantially uniformly dispersed," it is meant that the silica (or other components later identified, such as mineral oil) is substantially homogenously disbursed throughout the polyamide matrix and is not substantially aggregated or clumped together in a manner that allows for the resultant polyamide-based composition to have an inherent lubricity. "Inherent lubricity" is defined as a sufficient lubricity contained within the polyamide-based composition such that a lower amount of or no subsequent lubricating agent is required to be added in order to achieve the desired property of a low surface coefficient or friction for the product ultimately formed by the polyamide-based composition. In the case of cable or building wire production, this would mean no or significantly less pulling lubricant is required to be added in a post-polymerization process by a secondary extrusion compounder, by the cable producer, or at the job site by the end user.

In one embodiment, the method for preparation of a polyamide-based composition described above comprises first mixing more than 2 weight percent particulate silica, at least one polyamide-producing monomer, and water, to form a suspension wherein the particulate silica is substantially uniformly dispersed therein, and then polymerizing the at least one polyamide-producing monomer with the particulate silica substantially uniformly dispersed in situ to provide a polyamide matrix wherein the particulate silica remains substantially uniformly dispersed in the resulting polyamide matrix to form the polyamide-based composition. In a more particular embodiment, the step of mixing may be more particularly set forth by first mixing the at least one polyamide-producing monomer with water to form a reaction mixture and then adding the particulate silica to the reaction mixture to form a suspension before commencement of polymerization. In one embodiment, the step of mixing the silica and polyamide-producing monomer is performed without the addition of any lubricant additives, while in other embodiments, lubricant additives can be incorporated in to the suspension as later described. Thus, the present invention requires that the silica be added prior to polymerization of the polyamide-producing monomer into a polyamide matrix.

In some embodiments, the resultant polyamide-based composition may include some residual polyamide-producing monomer. Where this is the case, the method of the present invention may further comprise, after polymerization, extracting the residual polyamide-producing monomer from the polyamide-based composition to a level of less than 8 wt. %. In other embodiments, the residual polyamide-producing monomer may be extracted from the polyamide-based composition to a level of less than 5 wt. %. In still other embodiments, the residual polyamide-producing monomer may be extracted from the polyamide-based composition to a level of less than 3 wt. %. And in still other embodiments, the residual polyamide-producing monomer may be extracted from the polyamide-based composition to a level of less than 2 wt. %.

In some embodiments, it may be necessary to dry the polyamide-based composition to remove moisture. Where this is the case, the method of the present invention may further include, after polymerization, drying the polyamide-based composition to a moisture level of 1.8% by weight or less. In other embodiments, the polyamide-based composition may be dried to a moisture level of less than 1.5%. In still other embodiments, the polyamide-based composition may be dried to a moisture level of less than 1%.

In some embodiments, the method may further include pelletizing the polyamide-based composition. It will be appreciated that the polyamide-based composition can be formed into various products via post-polymerization processes without pelletizing. However, by pelletizing the polyamide-based composition, the composition will be easier to package and ship to various destinations where it can be further post-polymerization processed and formed into various products.

The polyamide-based composition can be formed into any desired product by any of a number of different methods. For example, in some embodiments either the same or different from the above embodiments, the product is formed by extruding the polyamide-based composition into an extruded product. In other embodiments the same or different from above embodiments, the product is formed by compounding the polyamide-based composition into a compounded product. In still other embodiments the same or different from above embodiments, the product is formed by casting the polyamide-based composition into a casted product. In yet other embodiments the same or different from above embodiments, the product is formed by molding the polyamide-based composition into a molded product. And in still other embodiments the same or different from other embodiments, the product is formed by thermoforming the polyamide-based composition into a thermoformed product. Notably, in each of the formation of product embodiments above, all of the resultant products have a lower surface coefficient of friction than a product substantially devoid of silica or where silica was added to the polyamide matrix after polymerization. Moreover, it is during these formation steps where lubricating agents, e.g., pulling lubricants, are commonly employed and are specifically used in the cable and wire industry. Thus, a polyamide-based composition of the present invention can be formed into a sheath or jacket of a cable or wire. In more particular embodiments, the polyamide-based composition is formed into an outside protective jacket in the production of thermoplastic-insulated wires or cables for building wire applications. Again, the resultant products have inherent lubricity to the extent that they have a sufficiently low coefficient of friction to not require the use of lubricating agents or, more specifically, pulling lubricants.

In other or the same embodiments, the polyamide-based composition may be formed into monofilament, typically by well known extrusion methods. In other or the same embodiments, the product may be formed into at least two twisted or braided strands. In other or the same embodiments, the product may be formed into a single layer film. In other or the same embodiments, the product may be formed into a multilayer film having at least two layers. In other or the same embodiments, the product may be formed into a molded part, such as by using known molding techniques. In other or the same embodiments, the product may be formed into a formed part by methods well known in the art. In other or the same embodiments, the product may be formed into a powder coating. And in other or the same embodiments, the product may be formed into a spray coating.

It will be appreciated that any known monomer suitable for producing a polyamide when polymerized may be used in the present invention. In some embodiments of the present invention, the at least one polyamide-producing monomer may be selected from caprolactam, 11-amino undecanoic acid, and laurolactam so as to produce nylon 6, nylon 11 and nylon 12, respectively. In other embodiments, the at least one polyamide-producing monomers includes at least two monomers wherein hexamethylenediamine (HMD) is reacted with an acid selected from adipic acid (to produce nylon 6,6), azelaic acid (to produce nylon 6,9), sebacic acid (to produce nylon 6,10), and dodecanedioic acid (to produce nylon 6,12). In other embodiments, the polyamide-producing monomers may be made into polyamide copolymers by the addition of caprolactam (or lauralactam, where nylon 12 is desired as one of the blocks) with the hexamethylenediamine and one of the acid above. Such copolymers would include nylon 6/66 (with adipic acid), nylon 6/69 (with azelaic acid), nylon 6/610 (with sebacic acid) and nylon 6/612 (with dodecanedioic acid). In still another embodiment, caprolactam may be copolymerized with laurolactam to produce nylon 6/12. In the present invention, any diamine can essentially be added with any diacid to produce a polyamide matrix suitable for the present invention. Likewise, at least one polyamide-producing monomer can be selected from any number of diamines (typically at least one) and any number of diacids (typically at least two) sufficient to produce a polyamide copolymer. In one embodiment, the at least one polyamide-producing monomer is caprolactam.

In one or more embodiments herein of the present invention, the silica is amorphous. In other or the same embodiments herein, the silica is micronized. In other or the same embodiments herein, more than 3 wt. % of silica is loaded or mixed with the polyamide-producing monomer and water. In other embodiments, from about 3 wt. % to about 12 wt. % of silica is loaded. In other or the same embodiments herein, from more than 3 wt. % to less than 9 wt. % of silica is loaded. In other embodiments, more than 4 wt % to less than 8 wt. % of silica is mixed. In one embodiment, the silica is loaded at 6 wt. %. In other or the same embodiments, the silica may be characterized by an average particle size of from about 1 micron to about 20 microns. In other or the same embodiments, the silica may be characterized by an average particle size of from about 2 microns to about 12 microns. In other or the same embodiments herein, the silica may be characterized by an average particle size from about 6 microns to about 11 microns. In other or the same embodiments herein, the silica may be characterized by an average pore volume of from about 1.25 mL/g to about 1.6 mL/g. This pore volume of the silica is believed to allow lubricant additives such as mineral oil to be incorporated into the in situ polymerization with the silica in some embodiments. In one or more of the embodiments herein, the method may be devoid of silicone-based or erucamide-based pulling lubricants.

In addition to incorporating silica, one or more embodiments of the present invention may include mixing at least one lubricant additive with the silica, the at least one polyamide-producing monomer, and the water to form an emulsion prior to polymerization, wherein the particulate silica and the at least one lubricant additive is substantially uniformly dispersed in the emulsion and then polymerizing the at least one polyamide-producing monomer with the particulate silica and the at least one lubricant additive substantially uniformly dispersed in situ to provide a polyamide matrix wherein the particulate silica and the at least one lubricant additive remains substantially uniformly dispersed in the resulting polyamide matrix to form the polyamide-based composition. Such lubricant additives may include silicone oil, fatty amides, metallic fatty acids, ester-based fatty acids, petroleum jelly, petroleum-based oil, mineral oil, plant-based oils, plasticizers, dibasic esters, silicones, anti-static amines, organic amities, ethanolamines, mono- and di-glyceride fatty amines, ethoxylated fatty amines, zinc stearate, stearic acids, palmitic acid, calcium stearate, lead stearate, sulfates and zinc sulfates. In a more particular embodiment, the step of mixing may be more particularly set forth by first mixing the at least one polyamide-producing monomer with water to form a reaction mixture; then adding particulate silica to the reaction mixture to form a suspension; and then adding the at least one lubricant additive to the suspension before commencement of polymerization to form an emulsion, such that the silica aids the distribution of the at least one lubricant additive substantially uniformly throughout the emulsion. The addition of the at least one lubricant additive together with the silica, polyamide-producing monomers and water results in a mixture/suspension/emulsion that when polymerized has increased surface lubricity as compared to polymers containing similar or the same levels of silica or lubricant additives alone. While the exact mechanism of this synergy is still a matter of speculation, it is believed that the silica acts as a compatibliizing agent for hydrophobic lubricant additives and the more hydrophilic monomer/water mixture significantly improving the dispersion of the lubricant additives. Polyamides produced in this manner have been found to contain sufficient inherent lubricity such that they may be processed into low friction cables without the addition of any lubricating agents.

In one or more embodiments, from about 0.1 wt. % to about 12 wt. % of the at least one lubricant additive may be mixed. In other embodiments, from about 1 wt. % to about 10 wt. % of the at least one lubricant additive may be mixed. In still other embodiments, from about 3 wt. % to less than 9 wt. % of the at least one lubricant additive may be mixed.

In another embodiment of the present invention, mineral oil may be mixed with the silica, the at least one polyamide-producing monomer, and the water to form an emulsion prior to polymerization, wherein the particulate silica and mineral oil are substantially uniformly dispersed in the emulsion. The at least one polyamide-producing monomer is then polymerized with the particulate silica and the mineral oil substantially uniformly dispersed in situ to provide a polyamide matrix wherein the particulate silica and the mineral oil remains substantially uniformly dispersed in the resulting polyamide matrix to form the polyamide-based composition. In a more particular embodiment, the step of mixing the mineral oil includes first mixing the at least one polyamide-producing monomer with water to form a reaction mixture; then adding particulate silica to the reaction mixture to form a suspension; and then adding mineral oil to the suspension before commencement of polymerization to form an emulsion, such that the silica aids the distribution of the mineral oil substantially uniformly throughout the emulsion.

In one or more embodiments, from about 1 wt. % to about 12 wt. % of mineral oil may be mixed. In other embodiments, from about 3 wt. % to about 10 wt. % of mineral oil may be mixed. In still other embodiments, from about more than 3 wt. % to less than 9 wt. % of the mineral oil may be mixed may be mixed. In another embodiment, about 5 wt % mineral oil is mixed. Furthermore, where mineral oil is the only lubricant additive used with silica, the ratio of silica to mineral oil is from about 100:1 to about 1:1.5. In other embodiments, the ration of silica to mineral oil is from about 1.5:1 to about 1:1.5. In another embodiment the ratio of silica to mineral oil is about 6:5.

In some embodiments where mineral oil is mixed with the silica, the at least one polyamide-producing monomer, and water, the step of mixing may further include mixing at least one other lubricant additive other than mineral oil with the silica, mineral oil, the at least one polyamide-producing monomer, and the water to form an emulsion prior to polymerization, wherein the particulate silica, mineral oil and at least one other lubricant additive are substantially uniformly dispersed in the emulsion. Such other lubricant additives may be selected from the group consisting of silicone oil, ester-based fatty acids, petroleum jelly, petroleum-based oil, plant-based oils, plasticizers, dibasic esters, silicones, anti-static amines, organic amities, ethanolamides, mono- and di-glyceride fatty amines, ethoxylated fatty amines, zinc stearate, stearic acids, palmitic acid, calcium stearate, lead stearate, sulfates and zinc sulfates. The step of polymerizing may include polymerizing the at least one polyamide-producing monomer with the particulate silica, the mineral oil, and the at least one other lubricant additive all substantially uniformly dispersed in situ to provide a polyamide matrix wherein the particulate silica, the mineral oil and the at least one other lubricant additive remains substantially uniformly dispersed in the resulting polyamide matrix to form the polyamide-based composition.

In one or more embodiments, from about 0.01 wt. % to about 12 wt. % of the at least one other lubricant additive may be mixed. In other embodiments, from about 0.1 wt. % to about 10 wt. % of the at least one other lubricant additive may be mixed. In still other embodiments, from about 1 wt. % to less than 9 wt. % of the at least one other lubricant additive may be mixed. In another embodiment, about 3 wt. % of the at least one other lubricant additive may be mixed. Where another lubricant additive other than mineral oil is mixed with silica and mineral oil, the ratio of silica to mineral oil and at least one other lubricant additive combined is from about 1:1.5 to about 100:1. That is, the total combined amount of all lubricant additives including mineral oil and any other lubricant additive should not be more than 1.5 times the amount of silica used. More preferably, the amount of the combined amounts of lubricant additives, including mineral oil and other lubricant additives, should not be greater than the amount of silica used.

Another aspect of the present invention may be achieved by a method for the preparation of a polyamide-based composition, wherein particulate silica and mineral oil are substantially uniformly dispersed within a polyamide matrix that forms the polyamide-based composition. In one embodiment, the method includes first mixing particulate silica, mineral oil, at least one polyamide-producing monomer, and water, to form a suspension/emulsion wherein the particulate silica and mineral oil are substantially uniformly dispersed therein and then polymerizing the at least one polyamide-producing monomer with the particulate silica and mineral oil substantially uniformly dispersed in situ to provide a polyamide matrix wherein the particulate silica and mineral oil remain substantially uniformly dispersed in the resulting polyamide matrix to form the polyamide-based composition. In a more particular embodiment, the step of mixing includes first mixing the at least one polyamide-producing monomer with water to form a reaction mixture; then adding particulate silica to the reaction mixture to form a suspension; and then adding mineral oil to the suspension to form an emulsion before commencement of polymerization.

In some embodiments of the invention described above, the resultant polyamide-based composition may include some residual polyamide-producing monomer. Where this is the case, the method of the present invention may further comprise, after polymerization, extracting the residual polyamide-producing monomer from the polyamide-based composition to a level of less than 8 wt. %. In other embodiments, the residual polyamide-producing monomer may be extracted from the polyamide-based composition to a level of less than 5 wt. %. In still other embodiments, the residual polyamide-producing monomer may be extracted from the polyamide-based composition to a level of less than 3 wt. %. And in still other embodiments, the residual polyamide-producing monomer may be extracted from the polyamide-based composition to a level of less than 2 wt. %.

In some embodiments of the above invention, it may be necessary to dry the polyamide-based composition to remove moisture. Where this is the case, the method of the present invention may further include, after polymerization, drying the polyamide-based composition to a moisture level of 1.8% by weight or less. In other embodiments, the polyamide-based composition may be dried to a moisture level of less than 1.5%. In still other embodiments, the polyamide-based composition may be dried to a moisture level of less than 1%.

In some embodiments of the above invention, the method may further include pelletizing the polyamide-based composition. It will be appreciated that the polyamide-based composition can be formed into various products via post-polymerization processes without pelletizing. However, by pelletizing the polyamide-based composition, the composition will be easier to package and ship to various destinations where it can be further post-polymerization processed and formed into various products.

The polyamide-based composition made from in situ polymerization of at least silica and mineral oil with at least one polyamide-producing monomer and water can be formed into any desired product by any of a number of different methods. For example, in some embodiments either the same or different from the above embodiments, the product is formed by extruding the polyamide-based composition into an extruded product. In other embodiments the same or different from above embodiments, the product is formed by compounding the polyamide-based composition into a compounded product. In still other embodiments the same or different from above embodiments, the product is formed by casting the polyamide-based composition into a casted product. In yet other embodiments the same or different from above embodiments, the product is formed by molding the polyamide-based composition into a molded product. And in still other embodiments the same or different from other embodiments, the product is formed by thermoforming the polyamide-based composition into a thermoformed product. Notably, in each of the formation of product embodiments above, all of the resultant products have a lower surface coefficient of friction than a product substantially devoid of silica and mineral oil or where silica or mineral oil was added to the polyamide matrix after polymerization. Thus, a polyamide-based composition of the present invention can be formed into a sheath or jacket of a cable or wire. In more particular embodiments, the polyamide-based composition is formed into an outside protective jacket in the production of thermoplastic-insulated wires or cables for building wire applications. The resultant products have inherent lubricity to the extent that they have a sufficiently low coefficient of friction to not require the use of lubricating agents or, more specifically, pulling lubricants.

In other or the same embodiments, the polyamide-based composition may be formed into monofilament, typically by well known extrusion methods. In other or the same embodiments, the product may be formed into at least two twisted or braided strands. In other or the same embodiments, the product may be formed into a single layer film. In other or the same embodiments, the product may be formed into a multilayer film having at least two layers. In other or the same embodiments, the product may be formed into a molded part, such as by using known molding techniques. In other or the same embodiments, the product may be formed into a formed part by methods well known in the art. In other or the same embodiments, the product may be formed into a powder coating. And in other or the same embodiments, the product may be formed into a spray coating.

Any known monomer suitable for producing a polyamide when polymerized may be used in the present invention described above. In some embodiments of the present invention, the at least one polyamide-producing monomer may be selected from caprolactam, 11-amino undecanoic acid, and laurolactam so as to produce nylon 6, nylon 11 and nylon 12, respectively. In other embodiments, the at least one polyamide-producing monomers includes at least two monomers wherein hexamethylenediamine (HMD) is reacted with an acid selected from adipic acid (to produce nylon 6,6), azelaic acid (to produce nylon 6,9), sebacic acid (to produce nylon 6,10), and dodecanedioic acid (to produce nylon 6,12). In other embodiments, the polyamide-producing monomers may be made into polyamide copolymers by the addition of caprolactam (or lauralactam, where nylon 12 is desired as one of the blocks) with the hexamethylenediamine and one of the acid above. Such copolymers would include nylon 6/66 (with adipic acid), nylon 6/69 (with azelaic acid), nylon 6/610 (with sebacic acid) and nylon 6/612 (with dodecanedioic acid). In still another embodiment, caprolactam may be copolymerized with laurolactam to produce nylon 6/12. In the present invention, any diamine can essentially be added with any diacid to produce a polyamide matrix suitable for the present invention. Likewise, at least one polyamide-producing monomer can be selected from any number of diamines (typically at least one) and any number of diacids (typically at least two) sufficient to produce a polyamide copolymer. In one embodiment, the at least one polyamide-producing monomer is caprolactam.

In one or more embodiments herein of the present invention, the silica is amorphous. In other or the same embodiments herein, the silica is micronized. In other or the same embodiments herein, at least 0.1 wt. % of silica is loaded or mixed with the polyamide-producing monomer and water. In other embodiments, from about 1 wt. % to about 12 wt. % of silica is loaded. In other or the same embodiments herein, from more than 3 wt. % to less than 9 wt. % of silica is loaded. In other embodiments, more than 4 wt. % to less than 8 wt. % of silica is mixed. In one embodiment, the silica is loaded at 6 wt. %. In other or the same embodiments, the silica may be characterized by an average particle size of from about 1 micron to about 20 microns. In other or the same embodiments, the silica may be characterized by an average particle size of from about 2 microns to about 12 microns. In other or the same embodiments herein, the silica may be characterized by an average particle size from about 4 microns to about 11 microns. In other or the same embodiments, the silica may be characterized by an average particle size of from about 6 microns to about 10 microns. In other or the same embodiments herein, the silica may be characterized by an average pore volume of from about 1.25 mL/g to about 1.6 mL/g. Without being bound by theory, the pore volume of the silica is believed to allow the mineral oil to be incorporated into the in situ polymerization with the silica. In one or more of the embodiments herein, the method may be devoid of silicone-based or erucamide-based pulling lubricants.

In one or more embodiments, from about 0.1 wt. % to about 12 wt. % of silica and from about 0.1 wt. % to about 12 wt. % mineral oil may be mixed with the polyamide-producing monomer and water. In other embodiments, from about 1 wt. % to about 12 wt. % of silica and from about 1 wt. % to about 6 wt. % mineral oil may be mixed. In still other embodiments, from about more than 3 wt. % to less than 9 wt. % of both the silica and mineral oil, separately, may be mixed. In another embodiment, about 6 wt. % silica and about 5 wt. % mineral oil are mixed. Furthermore, where mineral oil is the only lubricant additive used with silica, the ratio of silica to mineral oil is from about 100:1 to about 1:1.5. In other embodiments, the ration of silica to mineral oil is from about 1.5:1 to about 1:1.5. In another embodiment the ratio of silica to mineral oil is about 6:5.

In some embodiments where mineral oil, silica, the at least one polyamide-producing monomer, and water are mixed, the step of mixing may further include mixing at least one other lubricant additive other than mineral oil with the silica, mineral oil, the at least one polyamide-producing monomer, and the water to form an emulsion prior to polymerization, wherein the particulate silica, mineral oil and at least one other lubricant additive are substantially uniformly dispersed in the emulsion. Such other lubricant additives may be selected from the group consisting of silicone oil, ester-based fatty acids, petroleum jelly, petroleum-based oil, plant-based oils, plasticizers, dibasic esters, silicones, anti-static amines, organic amities, ethanolamines, mono- and di-glyceride fatty amines, ethoxylated fatty amines, zinc stearate, stearic acids, palmitic acid, calcium stearate, lead stearate, sulfates and zinc sulfates. The step of polymerizing may include polymerizing the at least one polyamide-producing monomer with the particulate silica, the mineral oil, and the at least one other lubricant additive all substantially uniformly dispersed in situ to provide a polyamide matrix wherein the particulate silica, the mineral oil and the at least one other lubricant additive remains substantially uniformly dispersed in the resulting polyamide matrix to form the polyamide-based composition. In a more particular embodiment, the step of mixing includes first mixing the at least one polyamide-producing monomer with water to form a reaction mixture; then adding particulate silica to the reaction mixture to form a suspension; and then adding mineral oil to form a first emulsion and then adding other lubricant additives to the first emulsion to form a second emulsion before commencement of polymerization, such that the silica aids the distribution of the mineral oil and the at least one other lubricant additive substantially uniformly throughout the second emulsion.

In one or more embodiments, from about 0.01 wt. % to about 12 wt. % of the at least one other lubricant additive may be mixed. In other embodiments, from about 0.1 wt. % to about 10 wt. % of the at least one other lubricant additive may be mixed. In still other embodiments, from about 1 wt. % to less than 9 wt. % of the at least one other lubricant additive may be mixed. In another embodiment, about 3 wt. % of the at least one other lubricant additive may be mixed. Where another lubricant additive other than mineral oil is mixed with silica and mineral oil, the ratio of silica to mineral oil and at least one other lubricant additive combined is from about 1:1.5 to about 100:1. That is, the total combined amount of all lubricant additives including mineral oil and any other lubricant additive should not be more than 1.5 times the amount of silica used. More preferably, the amount of the combined amounts of lubricant additives, including mineral oil and other lubricant additives, should not be greater than the amount of silica used.

Yet another aspect of this invention may be achieved by a polyamide-based composition comprising a polyamide matrix having silica substantially uniformly dispersed within the polyamide matrix. In other embodiments, the polyamide-based composition may comprise a polyamide matrix having silica and mineral oil substantially uniformly dispersed within the polyamide matrix. In still other embodiments, the polyamide-based composition may comprise a polyamide matrix having silica, mineral oil and at least one other lubricant additive substantially uniformly dispersed within the polyamide matrix. Such other lubricant additives may be selected from the group consisting of silicone oil, ester-based fatty acids, petroleum jelly, petroleum-based oil, plant-based oils, plasticizers, dibasic esters, silicones, anti-static amines, organic amities, ethanolamides, mono- and di-glyceride fatty amines, ethoxylated fatty amines, zinc stearate, stearic acids, palmitic acid, calcium stearate, lead stearate, sulfates and zinc sulfates. Such polyamide-based compositions have inherent lubricity such that, when made or otherwise formed into desired products, the products have a lower coefficient of friction as compared to those products produced from compositions that are devoid of any silica, or devoid of any silica and mineral oil, in the polyamide-based composition.

Such a polyamide-based composition is believed to have multiple applications, including use in as films, textiles, monofilaments, extruded parts, compounded parts, casted parts, molded parts and coatings. Still further, the composition is seen as a suitable for use as an emulsion. Such an emulsion of this type could be expanded to carry other hydrophobic moieties into the polymer matrix for the one of many different purposes including, but not limited to, drug delivery, fragrance, slip agents, anti-stats, pesticides, herbicides, fertilizers, antiseptics, antimicrobials, and organic dyes.

BRIEF DESCRIPTION OF THE DRAWINGS

All advantages of the present invention will become better understood with regard to the following description, appended claims, and accompanying drawings wherein:

FIG. 1 is schematic flow chart of the prior art production of products made from polyamide-based compositions, wherein FIG. 1A shows the polymerization of a polyamide-based composition of the prior art, and wherein FIG. 1B shows the production of a product such as wire or cable using lubricating agents added post-polymerization during an extrusion process to the prior art polyamide-based composition;

FIG. 2 is a schematic flow chart of the production of products made from polyamide-based compositions, wherein FIG. 2A shows the polymerization of a polyamide-based composition prepared according to the present invention, and wherein FIG. 2B shows the production of a product such as wire or cable according to the present invention;

DETAILED DESCRIPTION OF PREFERRED EMBODIMENTS

Figure 3:
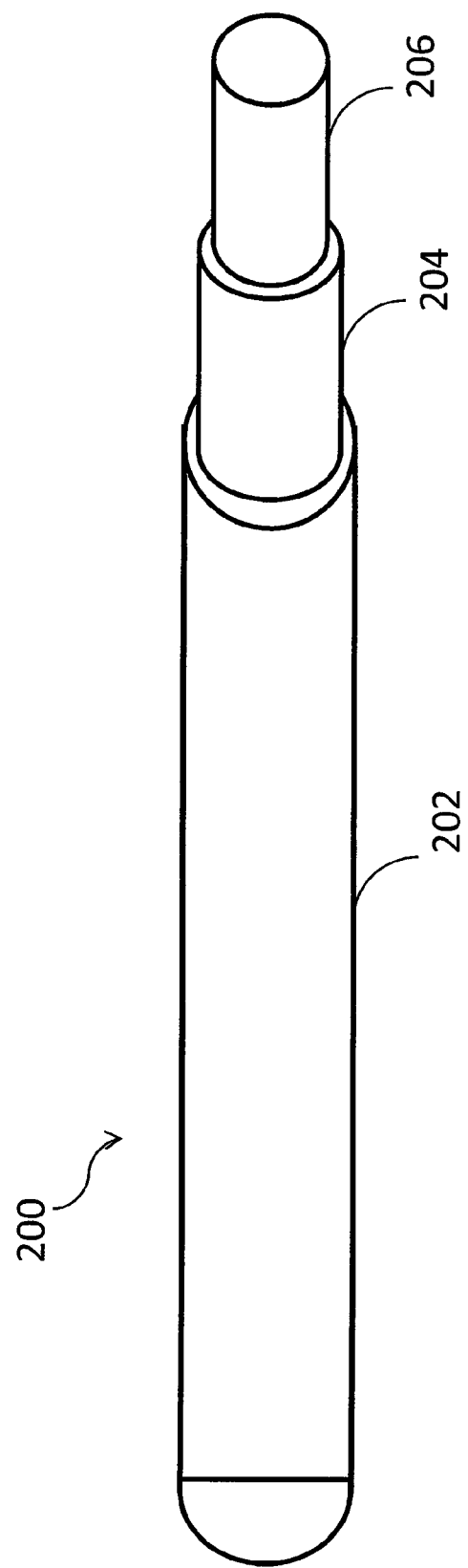
FIG. 3 is section view of cable according to the concepts of the present invention.

The present invention relates to the production of a polyamide-based (nylon polymer) composition that includes at least particulate silica, and optionally, mineral oil and other lubricant additives, that is substantially uniformly dispersed within the polyamide matrix. Such a polymer composition, when made or formed in products, has been found to have a lower surface coefficient of friction than other polymer compositions that do not incorporate particulate silica and/or mineral oil. Importantly, it is well known that particulate silica and, when added, mineral oil or other lubricating agents, aggregate and/or migrate to the surface of the product when added via well known post-polymerization processes such that the present invention provides a novel product.

More particularly, the present invention overcomes the aggregation and/or migration problem by mixing the particulate silica and, optionally, mineral oil and/or other lubricant additives, prior to or during polymerization of the polyamide-producing monomers. That is, the present invention mixes the particulate silica and, optionally, mineral oil and/or other lubricant additives, with one or more polyamide-producing monomers and water pre-polymerization to provide a liquid suspension or emulsion that can be in situ polymerized and, optionally, pelletized and dried, to form a polyamide matrix. Because particulate silica and, optionally, mineral oil and/or other lubricant additives, are added and substantially uniformly dispersed with the polyamide matrix and water before polymerization or as polymerization occurs (i.e., before or during polymerization=pre-polymerization), the particulate silica (and mineral oil and/or other lubricant additives, when added) have been found to remain substantially uniformly dispersed within the resultant polymer matrix that forms the polyamide-based composition.

Furthermore, products made from the polyamide-based composition have been found to inherently possess a lower surface coefficient of friction than other polyamide compositions polymerized without silica, (and/or mineral oil, or lubricating agents) added after polymerization. Thus, the polyamide-based compositions of the present invention made from the above described process have been found to be particularly useful in products where low surface coefficient of frictions are desirable. Such products made from the polyamide-based composition of the present invention include, but are not limited to, extruded parts, compounded parts, casted parts, molded parts, films, filaments, fibers, jackets and sheaths, More particularly, compositions of the present invention are believed to be particularly useful in, but limited to, low friction cables or "slick" sheaths for cables commonly used in building wire. In at least one embodiment of the present invention, the resultant polymer matrix or composition can be used without the need for further addition of lubricating agents via a compounding/extrusion process.

The proposed mechanism for this phenomenon is the substantially homogeneous disbursement of silica particles throughout the polyamide matrix. Without being bound by theory, it is believed that by creating a microscopically roughened surface, the contact points of the polymeric surface from the media that it is in contact with would be reduced, thereby, reducing any Van der Waals forces or ionic interactions. It is also believed that by utilizing high loadings of high pore volume silica, a higher loading of mineral oil or other lubricant additives may be incorporated into the polyamide matrix without leaching, which is common to conventionally compounded nylon compositions with oils and other lubricating agents.

With regard to the Figures, FIG. 1 is a schematic representation of a prior art approach to the production of nylon and products made from polyamide-based compositions prepared from the nylon. In the prior art, FIG. 1A presents a method for the polymerization of nylon wherein at least one nylon-producing monomer 12 and water 14 are first mixed in a reaction mixing vessel 16, typically by stirring with a stirrer 18, to form a reaction mixture. The reaction mixture comprising only the monomer(s) and water is then subjected to polymerization as shown at 20. Upon polymerization, the resultant nylon may be subjected to pelletizing as shown at 22 to provide nylon pellets. The nylon pellets, denoted by dotted line 24, may include residual nylon-producing monomer. Thus, the nylon pellets may be subject to extraction, as shown at 26, of the nylon-producing monomer from the nylon pellets. The nylon pellets 24 may further be subjected to drying the nylon pellets, as at 28, to lower the moisture level therein. Once extracted and dried, the nylon pellets 24 may be packaged, such as into container(s) 30 and shipped from the polymer manufacturer, as by a moving vehicle 32 capable of carrying the containers 30 of the nylon pellets to a product manufacturer. It will be appreciated that all steps of the nylon polymer manufacturing process after polymerization are considered to be post-polymerization steps, including pelletizing, extraction of residual monomer, drying, and shipment of the nylon pellets 24 to the product manufacturer.

In FIG. 1B, it is well known that upon receiving the shipment of containers 30 of nylon pellets, the containers 30 may be removed from the moving vehicle 32 and opened. The nylon pellets may be removed from the container 30 and placed into a hopper (not shown) for further processing and formation into a product. In the formation of the product, the nylon pellets may be subsequently remelted and formed into a desired product. For example, in some cases, the product may be formed by extruding the nylon pellets into an extruded product. In other cases, the product may be formed by compounding the nylon pellets into a compounded product. In still other cases, the product may be formed by casting the nylon pellets into a casted product. In yet other cases, the product may be formed by molding the nylon pellets into a molded product. And in still other cases, the product may be formed by thermoforming the nylon pellets into a thermoformed product. All of these cases are schematically represented by the machine 34 used to extrude, compound, cast, mold, or thermoform the product.

It is noted here that during formation of the product, one or more lubricating agents, as shown at 36, are well known to be added and incorporated into the remelted nylon material. Such lubricating agents, as noted above, include silicone-based oils and erucamide-based oils, and other such pulling lubricants, as well as processing lubricants that aid in the formation of the resultant product as depicted schematically as film 38 or cable 40.

It will be appreciated that more than one of these product formation steps can be employed in the prior art in subsequent steps. For example, the container(s) 30 of nylon pellets 24 can be first shipped to a compound manufacturer who would take the nylon pellets 24, remelt them, add a lubricating agent 36, and repelletize the compounded product for further delivery to a further product manufacturer, who may then receive the compounded pelletized product for use in an extrusion or molding process by remelting the compounded pelletized product and making a new product 40 from the compounded pelletized product. However, it will be understood that the addition of a lubricating agent occurs after the polymerization (i.e., post-polymerization) of the nylon regardless of the number of product formation steps employed.

With respect to the FIG. 2, a schematic representation of the approach to the production of polyamide-based compositions of the present invention (FIG. 2A) and products made from polyamide-based compositions of the present invention (FIG. 2B), is depicted. In FIG. 2A, a method for the preparation of a polyamide-based composition is depicted, wherein particulate silica 111 and, optionally, at least one lubricant additive 113, such as, but not limited to, mineral oil, are mixed with at least one polyamide-producing monomer 112, and water 114, in a reaction mixing vessel 116, typically provided with a stirrer 118. to form a reaction mixture. More particularly, the at least one polyamide-producing monomer 112 may be mixed with water 114 to form a reaction mixture. Then, particulate silica 111 may be added to the reaction mixture to form a suspension. Then, optionally, mineral oil and/or one or more other lubricant additives 113, may be added to the suspension to form an emulsion before commencement of polymerization. Notably, the resultant suspension (where silica only is added) or emulsion (where one or more oils are added) is mixed so that the silica and, where added, the mineral oil and/or one or more other lubricant additives, are substantially uniformly dispersed in the polyamide-producing monomer and water reaction mixture.

Once mixed, the suspension or emulsion of substantially uniformly dispersed ingredients is then subjected to polymerization as shown at 120 such that the polyamide producing monomer is converted to a polyamide matrix. Thus, all silica and any lubricant additives, including mineral oil, if added, are added prior to polymerization (i.e., pre-polymerization) of the polyamide-producing monomer. Upon polymerization, the resultant polyamide-based composition includes at least silica, and if added, mineral oil and/or other lubricant additives, which remain substantially uniformly dispersed therein.

The resultant polyamide-based composition may then be subjected to pelletizing as shown at 122 to provide pellets of polyamide-based composition. The pellets, denoted by dotted line 124, may include residual polyamide-producing monomer. Thus, the pellets 124 may be subject to extraction of the polyamide-producing monomer as shown at 126. To extract the residual monomer, the polyamide-based composition is move to another reactor or vessel and then turned and tumbled with near boiling water (180-200° F.) in order to leach out the residual monomer. This results in a polyamide-based composition with about 8% or less residual monomer. In one or more embodiments, the residual monomer after extraction to a level of 3%. In other embodiments, the residual monomer after extraction is reduced to a level of less than 2%. In yet another embodiment, the residual monomer after extraction is 0.9% or less.

The pellets 124 may further be subjected to drying, as at 128, to lower the moisture level therein. In one embodiment, the pellets 124 may be dried to a moisture level of 1.8% or less. Once extracted and dried, the pellets 124 may be packaged, such as into container(s) 130, and shipped from the polymer manufacturer, as by a moving vehicle 132 capable of carrying the containers 130 of the pellets to a product manufacturer. Notably, the pellets 124 have inherent lubricity inasmuch as the silica and/or mineral oil and other lubricant additives remain substantially uniformly dispersed in the resultant polyamide-based composition.

In FIG. 2B, the preparation of a product made from the polyamide-based composition provided and schematically shown in FIG. 2A is shown. Specifically, upon receiving the shipment of containers 130 of pellets, the containers 130 may be removed from the moving vehicle 132 and opened. The pellets 124 may be removed from the container 130 and placed into a hopper (not shown) for further processing and formation into a product. In the formation of the product, the pellets may be subsequently remelted and formed into a desired product. For example, in some cases, the product may be formed by extruding the pellets into an extruded product.

In other cases, the product may be formed by compounding the pellets into a compounded product. In still other cases, the product may be formed by casting the pellets into a casted product. In yet other cases, the product may be formed by molding the pellets into a molded product. And in still other cases, the product may be formed by thermoforming the pellets into a thermoformed product. All of these cases are schematically represented by the machine 134 used to extrude, compound, cast, mold, or thermoform the product.

It is noted here that, in contrast to the prior art, no lubricating agents are added during the formation of the product, as the pellets provided for the formation of the product already have inherent lubricity. Thus, in at least one embodiment of the present invention, no lubricating agents are added to the remelted polyamide-based compositions that are used to form the product, as depicted schematically as film 138 or cable 140.

It will be appreciated that more than one of the product formation steps can be employed in subsequent steps. For example, the container(s) 130 of pellets 124 can be first shipped to a compound manufacturer who would take the pellets 124, remelt them, provide additional compounding additives, if desired, and repelletize the compounded product for further delivery to a further product manufacturer, who may then receive the compounded pelletized product for use in an extrusion or molding process by remelting the compounded pelletized product and making a new product 40 from the compounded pelletized product. However, it will be understood that there would be no need to add any lubricating agents to the remelted pellets of polyamide-based composition either at the compounding stage or the extrusion/molding stage as set forth in the above example, since the pellets already have inherent lubricity as discussed above.

Among the many uses for such polyamide-based (also known as nylon-based) compositions of the present invention include the production of building wire or cables. Referring to FIG. 3, a representation of a cable according to the present invention is depicted. The cable 200 is shown with an outer jacket 202 surrounding an insulating layer 204. The outer jacket 202 and insulating layer 204 may together be referred to as a sheath. Typically, a jacket is the exterior-most portion of the sheath and may be up to 10 mils thick. The sheath covers and protects the conducting core 206 which may consist of a single metal wire, multiple small wires twisted together to make a "stranded" cable, or multiple insulated wires or other type electrical conductors. The composition of the present invention may be used to provide the outer jacket 202, which may comprise one or more layers of polymeric materials to provide physical, mechanical, electrical insulating and/or chemical protection for the underlying cable components. The insulating layer 204 may be made of polymeric materials selected from the group consisting of: polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like. In one or more embodiments, the insulating layer 204 is made of polyvinyl chloride (PVC) electrical insulation.

As noted above, the outer jacket 202, or exterior portion of the sheath, of the cable according to the present invention is comprised of a polymer material. In one or more embodiments, the polymeric material is a polyamide as will be discussed in more detail below. In some embodiments, the polyamide-based composition of the present invention is characterized as having silica uniformly dispersed therein. In other embodiments, the polyamide-based composition of the present invention is characterized as having silica and mineral oil uniformly dispersed therein. In still other embodiments, the polyamide-based composition of the present invention is characterized as having silica, mineral oil and other lubricant additives uniformly dispersed therein.

It will be appreciated that the need for an outer jacket exhibiting a low coefficient of friction is met by the present invention. More generally, the need for an easy to manufacture, low coefficient of friction polyamide-based composition is also met by the invention. By incorporating silica and, optionally, mineral oil and/or other lubricant additives, into the polyamide matrix via in situ polymerization in one or more embodiments, an innovative polymer composition suitable, for example, for use in the manufacture of low slick cables is provided.

Nylon is the generic name for a family of polyamide polymers characterized by the presence of an amine (—NH) group and an acid (—C=O) group within the monomer. The most basic chemical form of nylon is

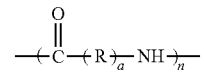

where R is any saturated or unsaturated, branched or unbranched, substituted or unsubstituted, aliphatic, cyclic or aromatic hydrocarbon and a and n separately equal any positive integer. This is considered an AB type nylon, the A referring to the acid and the B referring to the amine. Where a=6, caprolactam is produced as the monomer, nylon 6 being the polymer produced therefrom. Other well known nylons of the AB type include nylon 11 and 12, wherein the numeral sets forth the number of primary carbons within the structure. More specifically, the polymerization of 11-amino undecanoic acid produces nylon 11, while the polymerization of laurolactam produces nylon 12.

In addition to the above nylons, other nylons are characterized by the use of diacids and diamines to produce a polymer having the general chemical structure

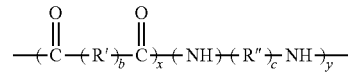

where R' and R" may be the same or different and, like R above, are any saturated or unsaturated, branched or unbranched, substituted or unsubstituted, aliphatic, cyclic or aromatic hydrocarbon, b and c are separately any positive integer, and x and y equals molar percent 1 to 99%. These AABB type nylons, i.e., those polyamides characterized by diamine and diacid monomers, are well known in the art. The most common of these types of nylons is nylon 6,6 (hexamethylenediammonium adipate) which includes a 6 carbon diamine (e.g., hexamethylenediamine) and a 6 carbon diacid monomer (e.g., adipic acid). Other such nylons include, inter alia, nylon 6,9, nylon 6,10, nylon 6,12, produced by the polymerization reaction of hexamethylenediamine with a diacid selected from azelaic acid (to make nylon 6,9), sebacic acid (to make nylon 6,10) or dedecanedioic acid (to make nylon 6,12).

Polymers of the AABB type having high molecular weights can be derived as condensation products from the reaction of fatty dibasic acids (e.g., $C_{18}$, $C_{19}$, $C_{21}$, and $C_{36}$) and di- and polyfunctional amines. For purposes of this disclosure, the term "fatty dibasic acid" will refer to any of the high molecular weight diacids of at least 15 primary carbon units. Examples include pentadecanedioic acid, commonly known to have 15 carbon units ($C_{15}$), and carboxystearic acid, commonly known to have 19 carbon units ($C_{19}$). A more complete description of fatty acids as they relate to the production of polyamides can be found in "Polyamides from Fatty Acids," *Encyclopedia of Polymers*. Vol. 11, pp. 476-89 (1988), which is incorporated herein by reference. Those skilled in the art will readily appreciate that a high molecular diacid, such $C_{18}$, can be changed into a high molecular diamine through known chemical reactions. Generally it is known in the art that nylon 6,36 and other fatty acid/diamine based polymers are not soluble in typical solvents such as water, these polymers must be polymerized with chain terminators and low molecular weight acids to increase solubility.

Polyamides, also referred to interchangeably herein as nylon or PA, suitable for use in the present invention include homopolymers nylon 6, nylon 6,6, nylon 6,9, nylon 6,10, nylon 11, nylon 12, as well as copolymers nylon 6/66, nylon 6/610, and nylon 6/12. Other copolymer examples may include nylon 66/610 or nylon 66/12. Non-limiting examples of polymers suitable in the present are listed in Table 1.

TABLE 1

Polyamide-producing monomer(s)

| Polyamide | Polyamide-producing monomer(s) |
|---|---|
| Homopolymer | |
| Nylon 6 or PA6 | ε-Caprolactam |
| Nylon 6,6 or PA 66 | hexamethylenediamine and adipic acid |
| Nylon 6,9 | Hexamethylenediamine and azelaic acid |
| Nylon 6,10 | Hexamethylenediamine with sebacic acid |
| Nylon 6,12 | hexamethylenediamine with dodecandioic acid |
| Nylon 11 | 11-amino undecanoic acid |
| Nylon 12 | laurolactam |
| Copolymer | |
| PA 6/66 | caprolactam, hexamethylenediamine and adipic acid |
| PA 6/610 | caprolactam, hexamethylenediamine, and sebacic acid |
| Nylon 6/12 | caprolactam and laurolactam |
| Nylon 66/610 | hexamethylenediamine, adipic acid and sebacic acid |
| Nylon 66/12 | laurolactam, hexamethylenediamine, adipic acid |

In one or more embodiments, the at least one polyamide-producing monomer is selected from caprolactam, 11-amino undecanoic acid, laurolactam, or mixtures thereof.

In other embodiments, the at least one polyamide-producing monomer is selected from hexamethylenediamine, adipic acid, azelaic acid, sebacic acid, 12-carbon dibasic (dodecanedioic) acid, caprolactam, or mixtures thereof, or mixtures with caprolactam or laurolactam, to produce copolymers.

In one or more embodiments, polyamides for use in the present invention include: Nylon 6, also known as Polyamide 6 or PA6. Nylon-6 is made from a single monomer called caprolactam, also known as 6-amino-caproic acid or c-Caprolactam. In one or more embodiments, the at least one polyamide-producing monomer is caprolactam.

In one or more embodiments, the polymer of the invention includes silica particles uniformly dispersed in the polyamide. Such materials are produced by the incorporation of silica particles into a polyamide matrix via in situ polymerization along with mineral oil. Silica, or as may be referred to interchangeably herein as silicon dioxide or $SiO_2$, particles may be crystalline or amorphous. Silica, as commonly used in paint, ink, plastic, paper, pharmaceutical, cosmetics industries, may be used. In one or more embodiments, for reasons of safety and performance, chemically inert amorphous silica is used. The silica may be further characterized by high porosity and surface area. High pore volume silica has more particles per weight, thereby providing higher efficiency. Furthermore, the high pore volume silica enables saturation of a high loading of mineral oil to be incorporated into the silica particles and hence incorporated together into the polyamide matrix.

In one or more embodiments, the particulate silica of the invention may be micronized to yield uniform, precisely defined particle sizes and distribution profiles. In one or more embodiments the silica particles of the invention are high purity, in other words the silica of the invention is no less than 99.5% silicon dioxide. In one or more embodiments, the silica of the invention may be characterized by an oil absorption value from about 190 to about 300 lbs/100 lbs. In other embodiments, the silica of the invention may be characterized by an oil absorption value from about 220 to about 290 lbs/100 lbs.

In one or more embodiments, the silica of the invention may be characterized by an average pore volume in the range from about 1.25 to about 1.60 mL/g. Commercially available silica useful in one or more embodiments of the present invention includes antiblocking additive Fuji Silysia, characterized by an average particle size from about 3.1 μm to about 20.0 μm. In at least one embodiment of the present invention, the silica is characterized by an average particle size from about 3.1 μm to about 20.0 μm. In one or more embodiments of the present invention, the silica may be characterized by an average particle size from about 4 μm to about 11 μm. In at least one embodiment of the present invention, grades of silica selected from grade 310P silica ("310P silica") of 2.7 μm particle size, grade 430 silica of 4.1 μm particle size, grade 460 silica of 11.0 μm particle size, or mixtures thereof, are used.

In at least one embodiment of the present invention, a loading of silica from about 1% to about 12% total weight of the polymer composition is incorporated. The polymer composition includes more than 2 wt % silica; in other embodiments more than 3 wt % silica; in other embodiments at least 4 wt % silica; and in other embodiments, from more than 3 wt % to less than 9 wt % silica. In at least one embodiment of the present invention, the polyamide-based composition includes from about 4 to about 8 wt % silica. In at least one embodiment of the present invention, the polyamide-based composition includes from about 5 to about 7 wt % silica. In at least one embodiment of the present invention, the polyamide-based composition includes about 6 wt % silica.

Certain oils have been known for some time in the art to provide lubricity to polymeric made products. Examples of such lubricants include fatty amides and metallic fatty acids include, but are not limited to, erucamide, oleamide, oleyl palmitamide, stearyl stearamide, stearamide, behenamide, ethylene bisstearamide, ethylene bisoleamide, stearyl erucamide, erucyl stearamide, and the like. Advantageous hydrocarbon oils include, but are not limited to, mineral oil, silicone oil, and the like. Examples of other lubricating materials include plasticizers, dibasic esters, silicones, anti-static amines, organic amines, ethanolamides, mono- and di-glyceride fatty amines, ethoxylated fatty amines, fatty acids, zinc stearate, stearic acids, palmitic acids, calcium stearate, lead stearate, sulfates such as zinc sulfate, etc., and the like. Yet other lubricating materials include fluorinated organic resins, such as a polymer of one or more fluorinated monomers selected from tetrafluoroethylene, vinylidene fluoride, chlorotrifluoroethylene and the like.

It has been discovered that by using in situ polymerization, silica particles are more apt to disperse uniformly within a polymer matrix. The attractiveness of silica particulates to certain oils is discussed in "*Stability of oil-in-water emulsions stabilised by silica particles*" by B P. Binks and S O. Lumsdon, *Phys. Chem. Chem. Phys.,* 1999, 1, 3007-3016, which is incorporated herein by reference. Thus, an aspect of the present invention is to incorporate the mineral oil into the silica for dispersion into the polymer matrix. As such, it has been found that not only does the silica disperse evenly, but also the mineral oil does as well. Importantly, it also does so without significant leaching of the mineral oil. Thus, it is desirable in the present invention to form an "emulsion" in aqueous formulations in order that the silica act as a suitable carrier of the oils during the in situ polymerization. In one or more embodiments of the invention, silica particles are dispersed in mineral oil, also known as white mineral oil or petroleum, during the in situ polymerization technique. In at least one embodiment of the present invention, commercially available mineral oil may be used such as BRITOL® 7 NF White Mineral Oil (Sonneborn, Inc., Mahwah, N.J.) characterized by a viscosity in the range of 10.80-13.60 cSt.

In at least one embodiment of the present invention, a loading of mineral oil from about 0.1 wt. % to about 12 wt. % total weight of the polymer composition is incorporated. In at least one embodiment of the present invention, the polymer composition includes a mineral oil component of more than 2 wt %, in other embodiments more than 3 wt %, in other embodiments more than 4 wt %, in other embodiments, from about 1 wt. % to about 10 wt %, and in other embodiments, from about more than 3 wt. % to less than about 9 wt. %. In another embodiment of the present invention, the polymer composition includes about 5 wt % mineral oil.

By using a high (.e.g., having an average pore volume of at least 1.25 mL/g) pore volume silica as in the present invention, the silica may act like a sponge and absorb a higher loading of mineral oil. The mineral oil may be absorbed and incorporated into the polyamide matrix during in situ polymerization. In at least one embodiment of the present invention, the weight percent of silica is substantially equal to the weight percent of mineral oil. Excess mineral oil or oversaturation of the silica is undesirable as the excess mineral oil leaches out from the polymer matrix. In at least one embodiment of the present invention, the silica to mineral oil ratio (by weight) is from about 100:1 to about 1:1.5. In other embodiments of the present invention, the silica to mineral oil ratio is 1:5:1 to about 1:1.5.

Typically, two industry-standard processes are used to produce a cable using the outer sheath composition of the present invention: the so called co-extrusion method and the tandem extrusion method. In both processes, the conductor, either solid or stranded, is first introduced into the extrusion head where the heated, melted PVC insulation compound is introduced and applied to the circumference of the conductor. In the co-extrusion process, the melted nylon compound is introduced into the same extrusion head and applied together with the PVC to the conductor, in a two-layer orientation. In the tandem process the PVC-coated conductor leaves the first extrusion head and is introduced into a second, separate extrusion head where the melted nylon is applied to the surface. In both cases, the final product is then introduced into a cooling water bath and ultimately the cooled product is wound onto reels.

A polyamide-based composition suitable for use as an outer jacket of a wire or cable according to the present invention provides advantages over the extruded finished polymers of the prior art as used for wires or cables in that, in at least one embodiment of the present invention, 1) a step of manufacture is removed wherein a separate pulling lubricant, or other lubricating agents, are not required to be compounded with the polyamide-based composition; 2) a more dispersed, homogenous polyamide-based composition and product is realized, and 3) the migration of mineral oil from the polymer matrices is reduced because of the inclusion of the oil in the silica particulates.

By incorporating oils into the polyamides of the present invention, further applications for this material are envisioned. By optimizing the combination of silica particulates in concentration and size, the concentration of mineral oil, and the extraction level, it has been found to decrease the coefficient of friction of a polyamide product. It is believed that products of the present invention provide a significant reduction in surface coefficient of friction over standard products that incorporate lubricating agents, and on par with similar "slick" products (commercially available by Encore SS and Nylene) produced by other compounded methods, which necessitate separate compounding step with pulling lubricant.

A low coefficient of friction composition according to the present invention may be applied advantageously in film and/or coating technology, textiles, monofilaments, and molded parts. An emulsion according to the polyamide composition of the present invention may be expanded upon to carry other hydrophobic moieties into the polymer matrix for the purposes of drug delivery, fragrance, slip agents, anti-stats, pesticides, herbicides, fertilizers, antiseptics-antimicrobial formulations, or organic dyes.

Various modifications and alterations that do not depart from the scope and spirit of this invention will be apparent to those skilled in the art. This invention is not to be duly limited to any illustrative embodiments set forth herein.

In light of the foregoing, it should thus be evident that the method and composition of the present invention substantially improves the art. The method of the present invention provides for the in situ polymerization at least one polyamide-producing monomer with silica and, optionally, mineral oil, to yield a polyamide matrix in which the silica and, optionally, mineral oil, is uniformly dispersed throughout the polyamide matrix. Advantageously, the polyamide materials of certain embodiments have been shown to have a low coefficient of friction while being substantially devoid of silicone-based or erucamide-based oils or other known pulling lubricants or lubricating agents.

While, in accordance with the patent statutes, only the preferred embodiments of the present invention have been described in detail hereinabove, the present invention is not necessarily to be limited thereto or thereby. Rather, the scope of the invention shall include all modifications and variations that fall within the scope of the attached claims.

What is claimed is:

1. A method for the preparation of a polyamide-based composition comprising particulate silica substantially uniformly dispersed into a polyamide matrix, the method comprising:

first mixing at least one polyamide-producing monomer with water to form a reaction mixture and then adding more than 2 weight percent particulate silica to the reaction mixture to form a suspension wherein the particulate silica is substantially uniformly dispersed therein;

then polymerizing the at least one polyamide-producing monomer with the particulate silica substantially uniformly dispersed in situ to provide a polyamide matrix wherein the particulate silica remains substantially uniformly dispersed in the resulting polyamide matrix to form the polyamide-based composition.

2. The method of claim 1, wherein the step of mixing the silica and polyamide-producing monomer is performed without the addition of lubricant additives.

3. The method of claim 1, wherein the polyamide-based composition includes residual polyamide-producing monomer and further comprising the step of extracting the residual polyamide-producing monomer from the polyamide-based composition to a level of less than 8%.

4. The method of claim 1, further comprising the step of drying the polyamide-based composition to remove moisture.

5. The method of claim 4, wherein the step of drying includes drying the polyamide-based composition to a moisture level of 1.8% by weight or less.

6. The method of claim 1, further comprising pelletizing the polyamide-based composition.

7. The method of claim 1, further comprising forming the polyamide-based composition into a product by performing any one of the following steps selected from the group consisting of extruding the polyamide-based composition into an extruded product, compounding the polyamide-based composition into a compounded product, casting the polyamide-based composition into a casted product, molding the polyamide-based composition into a molded product, and thermoforming the polyamide-based composition into a thermoformed product, wherein any of the resultant products have a lower surface coefficient of friction than a product substantially devoid of silica or where silica was added to the polyamide matrix after polymerization.

8. The method of claim 7, wherein the polyamide-based composition is formed into a sheath or jacket of a cable or wire.

9. The method of claim 8, wherein the polyamide-based composition is formed into an outside protective jacket in the production of thermoplastic-insulated wires or cables for building wire applications.

10. The method of claim 7, wherein the polyamide-based composition is formed into a product selected from the group consisting of a monofilament, at least two twisted or braided strands, a single layer film, a multilayer film having at least two layers, a molded part, a formed part, a powder coating, and a spray coating.

11. The method of claim 1, wherein the at least one polyamide-producing monomer is selected from caprolactam, 11-amino undecanoic acid, laurolactam, or mixtures thereof.

12. The method of claim 1, wherein the at least one polyamide-producing monomer is selected from hexamethylenediamine and a second polyamide-producing monomer is selected from adipic acid, azelaic acid, sebacic acid, and dodecanedioic acid.

13. The method of claim 1, wherein the at least one polyamide-producing monomer is selected from any number of diamines and any number of diacids sufficient to produce a polyamide copolymer.

14. The method of claim 1, wherein the particulate silica is amorphous.

15. The method of claim 1, wherein the silica is micronized.

16. The method of claim 1, wherein the particulate silica has an average particle size of between about 1 to about 20 μm.

17. The method of claim 1, wherein the particulate silica has an average pore volume of from about 1.25 to about 1.60 mL/g.

18. The method of claim 1, wherein more than 3 wt. % particulate silica is mixed.

19. The method of claim 1, wherein the step of mixing further includes mixing at least one lubricant additive selected from the group consisting of silicone oil, fatty amides, metallic fatty acids, ester-based fatty acids, petroleum jelly, petroleum-based oil, mineral oil, plant-based oils, plasticizers, dibasic esters, silicones, anti-static amines, organic amities, ethanolamides, mono- and di-glyceride fatty amines, ethoxylated fatty amines, zinc stearate, stearic acids, palmitic acid, calcium stearate, lead stearate, sulfates and zinc sulfates, with the silica, the at least one polyamide-producing monomer, and the water to form an emulsion prior to polymerization, wherein the particulate silica and the at least one lubricant additive is substantially uniformly dispersed in the emulsion.

20. The method of claim 19, wherein the step of mixing the lubricant additive includes first mixing the at least one polyamide-producing monomer with water to form a reaction mixture; then adding particulate silica to the reaction mixture to form a suspension; and then adding the at least one lubricant additive to the suspension before commencement of polymerization to form an emulsion, such that the silica aids the distribution of the at least one lubricant additive substantially uniformly throughout the emulsion.

21. The method of claim 19, wherein the step of polymerizing includes polymerizing the at least one polyamide-producing monomer with the particulate silica and the at least one lubricant additive substantially uniformly dispersed in situ to provide a polyamide matrix wherein the particulate silica and the at least one lubricant additive remains substantially uniformly dispersed in the resulting polyamide matrix to form the polyamide-based composition.

22. The method of claim 19, wherein about 0.01 wt. % to about 12 wt. % of the at least one lubricant additive is mixed.

23. The method of claim 19, wherein the step of mixing further includes mixing mineral oil with the silica, the at least one polyamide-producing monomer, and the water to form an emulsion prior to polymerization, wherein the particulate silica and mineral oil are substantially uniformly dispersed in the emulsion.

24. The method of claim 23, wherein the step of mixing the mineral oil includes first mixing the at least one polyamide-producing monomer with water to form a reaction mixture; then adding particulate silica to the reaction mixture to form a suspension; and then adding mineral oil to the suspension before commencement of polymerization to form an emulsion, such that the silica aids the distribution of the mineral oil substantially uniformly throughout the emulsion.

25. The method of claim 23, wherein the step of polymerizing includes polymerizing the at least one polyamide-producing monomer with the particulate silica and the mineral oil substantially uniformly dispersed in situ to provide a polyamide matrix wherein the particulate silica and the mineral oil remains substantially uniformly dispersed in the resulting polyamide matrix to form the polyamide-based composition.

26. The method of claim 23, wherein about 1 wt. % to about 12 wt. % mineral oil is mixed.

27. The method of claim 23, wherein the ratio of silica to mineral oil is from about 1.5:1 to about 1:1.5.

28. The method of claim 23, wherein the step of mixing further includes mixing at least one other lubricant additive other than mineral oil selected from the group consisting of silicone oil, ester-based fatty acids, petroleum jelly, petroleum-based oil, plant-based oils, plasticizers, dibasic esters, silicones, anti-static amines, organic amities, ethanolamides, mono- and di-glyceride fatty amines, ethoxylated fatty amines, zinc stearate, stearic acids, palmitic acid, calcium stearate, lead stearate, sulfates and zinc sulfates, with the silica, mineral oil, the at least one polyamide-producing monomer, and the water to form an emulsion prior to polymerization, wherein the particulate silica, mineral oil and at least one other lubricant additive are substantially uniformly dispersed in the emulsion.

29. The method of claim 28, wherein the step of polymerizing includes polymerizing the at least one polyamide-producing monomer with the particulate silica, the mineral oil, and the at least one other lubricant additive all substantially uniformly dispersed in situ to provide a polyamide matrix wherein the particulate silica, the mineral oil and the at least one other lubricant additive remains substantially uniformly dispersed in the resulting polyamide matrix to form the polyamide-based composition.

30. The method of claim 28, wherein the ratio of silica to mineral oil and at least one other lubricant additive combined is from about 1:1.5 to about 100:1.

31. A method for the preparation of an polyamide-based composition comprising particulate silica and mineral oil substantially uniformly dispersed into a polyamide matrix, the method comprising:
   first mixing particulate silica, mineral oil, at least one polyamide-producing monomer, and water, to form an emulsion or suspension wherein the particulate silica and mineral oil are substantially uniformly dispersed therein;
   then polymerizing the at least one polyamide-producing monomer with the particulate silica and mineral oil substantially uniformly dispersed in situ to provide a polyamide matrix wherein the particulate silica and mineral oil remain substantially uniformly dispersed in the resulting polyamide matrix to form the polyamide-based composition.

32. The method of claim 31, wherein the step of mixing includes first mixing the at least one polyamide-producing monomer with water to form a reaction mixture; then adding particulate silica to the reaction mixture to form a suspension; and then adding mineral oil to the suspension to form an emulsion before commencement of polymerization.

33. The method of claims 31, wherein the polyamide-based composition includes residual polyamide-producing monomer and further comprising the step of extracting the residual polyamide-producing monomer from the polyamide-based composition to a level of less than 8%.

34. The method of claim 31, further comprising the step of drying the polyamide-based composition to remove moisture.

35. The method of claim 34, wherein the step of drying includes drying the polyamide-based composition to a moisture level of 1.8% by weight or less.

36. The method of claim 31, further comprising pelletizing the polyamide-based composition.

37. The method of claim 31, further comprising forming the polyamide-based composition into a product by performing any one of the following steps selected from the group consisting of extruding the polyamide-based composition into an extruded product, compounding the polyamide-based composition into a compounded product, casting the polyamide-based composition into a casted product, molding the polyamide-based composition into a molded product, and thermoforming the polyamide-based composition into a thermoformed product, wherein any of the resultant products have a lower surface coefficient of friction than a product substantially devoid of silica or where silica was added to the polyamide matrix after polymerization.

38. The method of claim 37, wherein the polyamide-based composition is formed into a sheath or jacket of a cable or wire.

39. The method of claim 37, wherein the polyamide-based composition is formed into an outside protective jacket in the production of thermoplastic-insulated wires or cables for building wire applications.

40. The method of claim 37, wherein the polyamide-based composition is formed into a product selected from the group consisting of a monofilament, at least two twisted or braided strands, a single layer film, a multilayer film having at least two layers, a molded part, a formed part, a powder coating, and a spray coating.

41. The method of claim 31, wherein the at least one polyamide-producing monomer is selected from caprolactam, 11-amino undecanoic acid, laurolactam, or mixtures thereof.

42. The method of claim 31, wherein the at least one polyamide-producing monomer is selected from hexamethylenediamine and a second polyamide-producing monomer is selected from adipic acid, azelaic acid, sebacic acid, and dodecanedioic acid.

43. The method of claim 31, wherein the at least one polyamide-producing monomer is selected from any number of diamines and any number of diacids sufficient to produce a polyamide copolymer.

44. The method of claim 31, wherein the particulate silica is amorphous.

45. The method of claim 31, wherein the particulate silica is micronized.

46. The method of claim 31, wherein the particulate silica has an average particle size of between about 1 to about 20 μm.

47. The method of claim 31, wherein the particulate silica has an average pore volume of from about 1.25 to about 1.60 mL/g.

48. The method of claim 31, wherein from at least about 0.1 wt. % to about 12 wt. % particulate silica and from at least about 0.1 wt. % to about 12 wt. % mineral oil are mixed.

49. The method of claim 31, wherein the step of mixing further includes mixing at least one lubricant additive selected from the group consisting of silicone oil, ester-based fatty acids, petroleum jelly, petroleum-based oil, plant-based oils, plasticizers, dibasic esters, silicones, anti-static amines, organic amities, ethanolamides, mono- and di-glyceride fatty amines, ethoxylated fatty amines, zinc stearate, stearic acids, palmitic acid, calcium stearate, lead stearate, sulfates and zinc sulfates, with the silica, the mineral oil, the at least one polyamide-producing monomer, and the water to form an emulsion prior to polymerization, wherein the particulate silica, the mineral oil, and the at least one lubricant additive are substantially uniformly dispersed in the emulsion.

50. The method of claim 49, wherein the step of mixing the at least one lubricant additive includes first mixing the at least one polyamide-producing monomer with water to form a reaction mixture; then adding particulate silica to the reaction mixture to form a suspension; then adding the mineral oil to the suspension to form a first emulsion; then adding the at least one lubricant additive to the first emulsion to form a second emulsion before commencement of polymerization, such that the silica aids the distribution of the mineral oil and the at least one lubricant additive substantially uniformly throughout the second emulsion.

51. The method of claim 49, wherein the step of polymerizing includes polymerizing the at least one polyamide-producing monomer with the particulate silica, the mineral oil, and the at least one lubricant additive, which are all substantially uniformly dispersed in situ to provide a polyamide matrix wherein the particulate silica, the mineral oil and the at least one other lubricant additive remains substantially uniformly dispersed in the resulting polyamide matrix to form the polyamide-based composition.

52. The method of claim 49, wherein the ratio of silica to mineral oil and at least one other lubricant additive combined is from about 1:1.5 to about 100:1.

53. A polyamide-based composition comprising a polyamide matrix having silica substantially uniformly dispersed within the polyamide matrix and wherein mineral oil is substantially uniformly dispersed within the polyamide matrix with the silica.

54. The polyamide-based composition of claim 53, wherein at least one other lubricant additive is substantially uniformly dispersed within the polyamide matrix with the silica and mineral oil.

* * * * *